United States Patent [19]

Roets

[11] Patent Number: 4,559,146
[45] Date of Patent: Dec. 17, 1985

[54] METHOD OF CLARIFYING PROTEINACEOUS WASTE WATER CONTAINING SOLID IMPURITIES

[75] Inventor: Sarel D. Roets, Pretoria, South Africa

[73] Assignee: Silverton Tannery Limited, Pretoria, South Africa

[21] Appl. No.: 619,400

[22] Filed: Jun. 12, 1984

Related U.S. Application Data

[63] Continuation of Ser. No. 376,820, May 10, 1982, abandoned.

[30] Foreign Application Priority Data

May 20, 1981 [ZA] South Africa ............... 81/3392

[51] Int. Cl.$^4$ ................................. C02F 1/24
[52] U.S. Cl. ................................. 210/705
[58] Field of Search ......................... 210/703–705

[56] References Cited

U.S. PATENT DOCUMENTS

| | | |
|---|---|---|
| 3,147,217 | 3/1964 | Halton . |
| 3,787,316 | 1/1974 | Brink et al. ............ 210/704 X |
| 3,886,068 | 5/1975 | Eron ..................... 210/704 |
| 3,991,781 | 2/1976 | Willis et al. . |
| 4,001,114 | 1/1977 | Joseph et al. ............ 210/705 X |
| 4,108,768 | 8/1978 | Sebelik et al. ........... 210/705 |
| 4,203,837 | 8/1980 | Hoge et al. . |

FOREIGN PATENT DOCUMENTS 1353215 7/1974 United Kingdom .
1427437 4/1976 United Kingdom .

*Primary Examiner*—Thomas Wyse
*Attorney, Agent, or Firm*—Karl W. Flocks; Sheridan Neimark

[57] ABSTRACT

A method of clarifying proteinaceous waste water is provided involving feeding the water through a treatment zone where it is subjected to various treatment steps and from which it issues as a clarified product. Solid impurities are coagulated in said zone and 20–50% by mass of the waste water feed is recirculated as clarified product which is aerated to provide a foam containing less than 10% by volume of liquid, and which is mixed with the feed in or upstream of the treatment zone. Foam rises and floats to the surface of the liquid in the treatment zone from which it, with solids entrapped therein, is removed.

18 Claims, 1 Drawing Figure

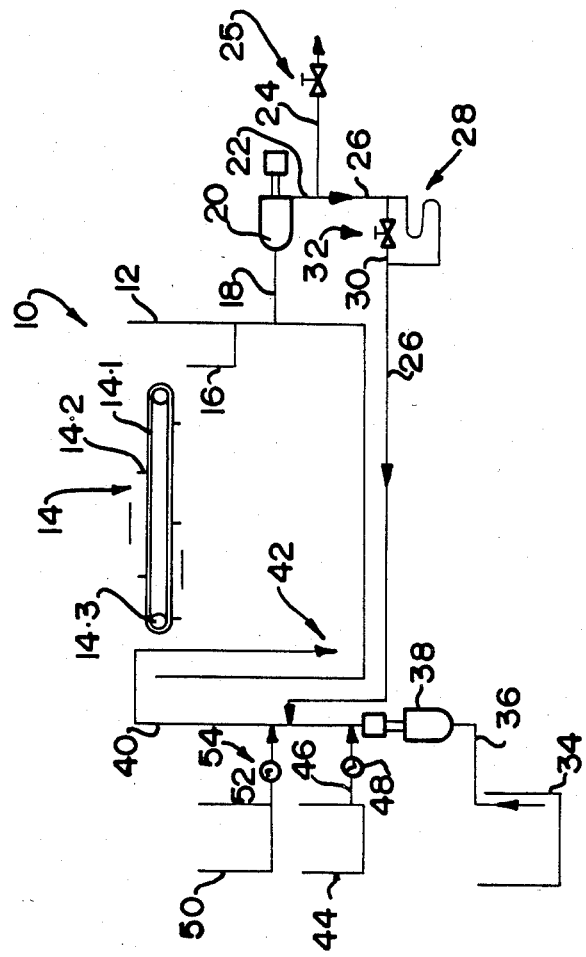

METHOD OF CLARIFYING PROTEINACEOUS WASTE WATER CONTAINING SOLID IMPURITIES

This application is a continuation, of application Ser. No. 376,820, filed May 10, 1982, abandoned.

This invention relates to a method of clarifying proteinaceous waste water containing solid impurities. In particular it relates to a method of treating proteinaceous waste water of the type containing solid or dissolved proteinaceous matter, such as waste water from tanneries or abattoirs, municipal sludges, pig slurries, etc.

According to the invention, a method of clarifying proteinaceous waste water containing solid impurities comprises feeding a proteinaceous waste water feed into and through a water treatment zone where it is subjected to various water-purification steps and from which it issues as a clarified product;

coagulating solid impurities in the waste water as it passes through said water treatment zone;

recirculating a proportion of the clarified product through the water treatment zone, the proportion recirculated amounting to 20–50% by mass of the waste water feed;

aerating the recirculated clarified product to form a continuous foam comprising less than 10% by volume of liquid, the recirculated foam being mixed with the waste water feed in or upstream of the water treatment zone;

permitting the foam to rise to and float on the surface of the water in the water treatment zone; and removing said foam and coagulated solids entrapped therein from the surface of the water in the water treatment zone.

Proteinaceous waste water can, in certain cases, be naturally occurring as in streams, dams, etc., although it is primarily encountered as agricultural, human or industrial effluents, such as tannery waste water.

The method will usually be carried out on a continuous or semi-continuous basis, the waste water feed being charged intermittently or continuously into a water treatment zone such as a tank, reservoir or the like, where the foam removal takes place, and from which the clarified product issues, the proportion of the clarified product correspondingly being intermittently or continuously recycled.

The waste water feed may be passed through a buffer zone before it is fed into the water treatment zone, thereby at least potentially to buffer fluctuations in the feed rate thereof.

Coagulating the solid impurities may be by dispersing a suitable coagulant in the waste water downstream of the buffer zone, the coagulant acting to cause the solid impurities to form flocs in the water in the water treatment zone. The coagulant and quantity thereof used, will be selected in accordance with the nature and impurity load of the waste water to be treated. Such coagulants may include auminium sulphate, alum, ferric sulphate, ferric chloride, etc. For tannery waste water, a suitable coagulant is ferric chloride (in a hydrochloric acid-containing aqueous solution with a pH below 7) or an aqueous solution of aluminium sulphate. Ferric chloride is typically used in concentrations of 200–400 mg per liter of waste water. Dispersing the coagulant into the waste water may be by injecting it into the waste water feed line to the water treatment zone, from a storage tank via a pump, the coagulant being introduced in the form of an aqueous solution.

Aerating the recirculated clarified product may be by means of vigorous agitation thereof, mixing of foam and feed preferably taking place at or downstream of the coagulant addition, although it may take place before coagulant addition.

The method may further include dispersing a polyelectrolyte in the waste water, downstream of the coagulant addition. The polyelectrolyte addition may take place at or downstream of the mixing of the waste water feed and foam. The polyelectrolyte acts to promote floc size increase, and the polyelectrolyte and the quantity used will in turn be selected in accordance with the nature of the waste water and the nature of the coagulant. The polyelectrolyte may also be added to the feed line to the water treatment zone, and suitable polyelectrolytes include high molecular weight polymers or copolymers. These are known in the art and available from several commercial sources. For tannery waste water and a ferric chloride coagulant, a cationic polyelectrolyte such as ZETAG 92, available from Allied Colloids Limited, Great Britain, may be used in amounts of from 5–20 mg/liter of waste water.

The vigorous agitation of the clarified product to obtain a foam comprising less than 10% by volume of liquid, may be by any suitable mechanical or hydraulic/pneumatic means, such as a blender, venturi aspirator, mechanical pump with forced air injection, a high speed mixer or the like, and a venturi system has been found to be convenient. When the proteinaceous material in the waste water acts to reduce its surface tension, a continuous foam can easily be produced without the addition of surfactants, for mixing with the effluent.

Passing the waste water feed through the buffer zone to buffer fluctuations in the feed rate, as mentioned above, is desirable in cases such as with tannery waste water, where waste water is produced in varying quantities and of varying compositions, the buffering thus acting to balance both flow and composition, to render the flow and composition of the waste water being treated as constant as possible when it is subjected to coagulation and mixing with foam.

A solids-containing sludge can settle from the water treatment zone, and the method may thus include recirculating any such sludge which settles to the bottom of the water treatment zone to the waste water feed to the water treatment zone, upstream of the coagulant addition.

Removal of the foam from the water treatment zone may be by scraping it off the surface of the water in the water treatment zone.

For tannery waste water, the method may involve removal of soluble sulphides, for example by oxidation, followed by stripping, prior to the coagulation. The oxidation may be effected by air, using floating aerators for example in the buffer zone used for balancing the feed, or by the introduction of hydrogen peroxide and sulphuric acid into said buffer zone. The sulphides are thus converted into oxidation products thereof, such as sulphates, which are more acceptable than the sulphides when waste water disposal is eventually effected.

For good floc formation and floation of solids, a pH of less than about 6,5 is desirable. When ferric chloride is used, this may thus be added in the form of an acid solution containing hydrochloric acid which acid aids in pH reduction, and when hydrogen peroxide is used for oxidation of sulphides, the quantity of sulphuric acid used may be set to promote an eventual pH, at coagulation, of 6-7. For the same reason, when floating aerators are used, sulphuric acid may be added at the same time, to assist in sulphide oxidation and in pH reduction for good eventual floc formation.

The invention extends to apparatus for carrying out the method described above, and which comprises a reservoir for holding water being treated and defining a water treatment zone;

foam-removal means for removing foam from the surface of water in the water treatment zone;

feed means for feeding waste water to be treated to the reservoir;

coagulant-dosing means for dosing coagulant to the water being treated;

recirculation means for recirculating clarified product issuing from the reservoir, to the reservoir, at a rate of 20-50% by mass of the feed rate provided by the feed means; and foam-generation means for aerating the recirculated clarified product to form a continuous foam therefrom containing less than 10% liquid by volume.

The reservoir may comprise a flotation tank, and will have a product discharge via which clarified product issues from the tank, and which is connected to a flow line including a foam generation means arranged to feed foam into the tank. The apparatus may include an inlet flow line provided with a feed pump for connection to a source of waste water to be treated, and provided with one or more metering pumps for connection to supplies of water treatment chemicals. The foam-removable means may include a foam scraper and foam discharge chute from the tank; and the flow line including the foam generator may feed into the inlet flow line.

The invention will now be described, by way of example, with reference to the accompanying diagrammatic drawing, which shows a schematic flow diagram of an apparatus for carrying out the method of the invention.

In the drawing, reference numeral 10 generally designates an apparatus for carrying out the invention. The apparatus 10 comprises a flotation and separating tank 12, provided with a continuous type foam scraper 14 having a belt 14.1 provided with scraper blades 14.2 and rotatable about a pair of pulleys 14.3 above the intended liquid level of the tank 12, and arranged to scrape foam floating on effluent in the tank 12 into a foam discharge chute 16.

The tank 12 is provided, below said intended liquid level, with an outlet flow line 18 connected to a pump 20 which feeds via flow line 22 into a clarified product flow line 24 provided with a valve 25. A flow line 26 extends from the junction between the flow line 22 and flow line 24 and includes a venturi-type foam generator 28 provided with a by-pass line 30 having a valve 32.

Upstream of the tank 12 there is a flow balancing or buffer tank 34 connected by flow line 36 to a pump 38 which pumps via flow line 40 into the tank 12, through a low level outlet at 42 which in use will be submerged. A coagulant supply tank 44 is connected by flow line 46 having a metering pump 48 into the flow line 40, and, downstream of this connection, a polyelectrolyte supply tank 50 is connected by flow line 52 having a metering pump 54 to the flow line 40.

The flow line 26 enters the flow line 40 between the flow lines 46 and 52.

In use tannery waste water, which may be tannery limeyard liquor or tannery tanyard liquor or completely mixed tannery waste water, is stored and balanced in the tank 34. From the tank 34 this waste water is pumped by pump 38 through flow lines 36 and 40 into the tank 12, which is maintained at a predetermined liquid level by a suitable level control device (not shown). Ferric chloride coagulant is metered from the tank 44 via the flow line 46 into the flow line 40 by the pump 48 at a rate of 200-400 mg/l waste water feed from the tank 34; and ZETAG 92 polyelectrolyte is metered from the tank 50 via the flow line 52 into the flow line 40 by pump 54 at a rate of 5-20 mg/l waste water feed from the tank 34. The pump 20 in turn pumps clarified effluent into the flow line 22 and thence into the discharge line 24 and into the flow line 26. A suitable flow splitting device (not shown) is provided at the junction between the flow lines 22, 24 and 26 to ensure that the overall flow through the flow line 24 balances the overall flow through the flow line 40, and so that the flow through the flow line 26 is a desired proportion, from 20-50% by mass, of the flow through the flow lines 24 and 36.

The foam generator 28 violently agitates the liquid in the flow line 26, and downstream of the generator, this liquid is in the form of a continuous foam containing no more than 10% by volume liquid, which foam flows into the flow line 40 between the points of addition into the flow line 40 of the coagulant and polyelectrolyte, where it mixes with flow from the tank 34.

Floc formation is initiated in the flow line 40 and after addition of the polyelectrolyte floc size increase starts to take place, which size increase continues in the tank 12.

The foam generator comprises a high speed centrifugal pump which pumps clarified effluent through a venturi nozzle into which air is sucked, to form a thick stable foam in the flow line 26 downstream of the foam generator 28. This foam, after it enters the flow line 40 continues along the flow line 40 and into the tank 12 at 42. From this point the foam rises to the top of the tank where it forms a thick, stable and relatively solid layer, interstitial water draining rapidly therefrom. The foam on the surface of the liquid in the tank is scraped off by the scraper 14 into the chute 16 from which it is discharged.

In rising to the top of the liquid in the tank 12, the foam carries with it substantially all the suspended solids in the tannery waste water which are entrapped therein, and which reduce to about 2% of their original mass, with the chromium content of the waste water reduced to about 1% of its original value. The suspended solids generally comprise organic material. In this regard it shoud be noted that the ferric chloride coagulant used, precipitates certain dissolved organic materials in the pH range 6-6,5, so that this pH range is promoted. The ZETAG 92, in addition to its primary function of binding flocs together for floc size increase, acts to make the foam hydrophobic, thereby promoting drainage of water from the foam.

The clarified product water has been found to be of sufficient purity for use as second grade water in tanning processes.

It should be noted that in the balancing or buffer tank 34 the tannery waste water will have been treated by oxygenation/aeration by means of floating surface aerators which cause turbulent mixing of the contents of the tank 34 to combat settling the suspended solids therein.

Oxygen introduced by this aeration acts to oxidise sulphides in the water in the tank 34. Instead or in addition, hydrogen peroxide can be introduced into the tank 34 to oxidise the sulphides. In each case sulphuric acid is added to the tank 34 both to assist in the oxidation of the soluble sulphides and to obtain the desired pH in the tank 12 during flocculation. When hydrogen peroxide is used, the tank 34 should have a capacity of about two-thirds of the daily waste water throughput of the apparatus 10, whereas when floating aerators are used it should have a capacity of about four times said daily throughput.

Suspended solid particles in tannery waste water have a natural affinity for sedimentation, and the proportion thereof is so high that the waste water can be regarded as a thin sludge on its own. It can contain an average after flocculation with primary coagulant (ferric chloride) up to 20 g of solids on a dry basis for every liter of waste water, and if allowed to settle the flocculated product layer can occupy up to 40% of the volume of the waste water. It is an advantage of the present invention that the method can handle heavy pollution loads of this type effectively, and in the embodiment shown in the drawings this is done on a relatively inexpensive basis with no flocculation chambers, or pressure vessels for dissolved air flotation. The foamed sludge produced by the method can be readily dewatered on drying beds or by mechanical pressing and no chemicals other than the polyelectrolyte and coagulant are needed, bearing in mind that the proteinaceous nature of the recirculated water used for foam production reduces its viscosity, thereby readily allowing a thick stable foam to be produced during the aeration.

The invention thus provides an easily applied and effective method for tannery waste water and other proteinaceous waste water clarification and, although a flocculation chamber in the feed line 40 and sludge recycling from the tank 12 into the feed line 40 upstream of the coagulant addition may in some instances be necessary or desirable, this has not been found to be the case for tannery waste water tested.

A further advantage of the present invention is that, provided that flow is sufficiently regular, or provided that suitable buffering is provided for the feed, it can handle waste water which varies greatly as far as solid particle size and nature is concerned. Tannery waste water contains highly irregular particles, as regards shape, nature and size, such as hair, skin, fat globules and the like. Its variability over short periods of time is such that to employ surfactant addition for foam generation in recirculated water, would be impracticable owing to the difficulty to control the rate of addition. However, by using the fact that proteinaceous waste water has a relatively low surface tension, and taking advantage of this to provide for foam generation without surfactants, variations in quantity and nature of the waste water can be catered for.

I claim:

1. In clarifying proteinaceous aqueous waste water containing solid impurities by:
    feeding a proteinaceous waste water feed into and through a water treatment zone where it is subjected to various water-purification steps and from which it issues as a clarified product;
    coagualating solid impurities in the waste water as it passes through said water treatment zone;
    recirculating a proportion of the clarified product through the water treatment zone;
    aerating the recirculated clarified product to form a foam, the recirculated foam being mixed with the waste water feed in or upstream of the water treatment zone;
    permitting the foam to rise to and float on the surface of the water in the water treatment zone; and
    removing said foam and coagulated solids entrapped therein from the surface of the water in the water treatment zone,
    the improvement which comprises at least reducing the use of surfactants in foam production by
    recirculating a proportion of the clarified product amounting to 20–50% by volume of said waste water feed; and
    aerating said recirculated clarified product to form a foam which is continuous and which comprises no less than 90% by volume of air, so that the air recirculated amounts to no less than 18% by volume of said waste water feed.

2. A method as claimed in claim 1, in which the waste water feed is passed through a buffer zone before it is fed into the water treatment zone, thereby at least potentially to buffer fluctuations in feed rate thereof.

3. A method as claimed in claim 2, in which coagulating the solid impurities is by dispersing a suitable coagulant in the waste water downstream of the buffer zone, the coagulant acting to cause the solid impurities to form flocs in the water in the water treatment zone.

4. A method as claimed in claim 1, in which aerating the recirculated clarified product is by means of vigorous agitation thereof, mixing of foam and feed taking place at or downstream of the coagulant addition.

5. A method as claimed in claim 1, which includes dispersing a polyelectrolyte in the waste water, downstream of the coagulant addition.

6. A method as claimed in claim 5, in which the polyelectrolyte addition takes place at or downstream of the mixing of the waste water feed and foam.

7. A method as claimed in claim 1, which includes recirculating any sludge which settles to the bottom of the water treatment zone to the waste water feed to the water treatment zone, upstream of the coagulant addition.

8. A method as claimed in claim 1, in which removing of the foam from the water treatment zone is by scraping it off the surface of the water in the water treatment zone.

9. A method of clarifying proteinaceous tannery waste water containing solid impurities, to provide a clarified water product containing a reduced proportion of said solid impurities and a fast-draining foam product containing solid impurities removed from the tannery waste water, the method comprising treating a proteinaceous tannery waste water feed in a single water treatment zone into which it is fed and from which issue a clarified water product and a fast-draining foam product, by:
    coagulating solid impurities in the waste water as it passes through said water treatment zone;
    recirculating a proportion of the clarified product through the water treatment zone, the proportion recirculated amounting to 20–50% by volume of the waste water feed;
    aerating the recirculated clarified product to form a continuous foam comprising no less than 90% by volume of air, the recirculated foam being mixed with the waste water feed in or upstream of the water treatment zone so that the air recirculated amounts to no less than 18% by volume of said waste water feed;

permitting the foam to rise to and float on the surface of the water in the water treatment zone; and removing, as a fast-draining foam product, said foam and coagulated solids entrapped therein from the surface of the water in the water treatment zone, while removing fully clarified final water product directly from the water treatment zone.

10. A method as claimed in claim 9, in which the waste water feed is passed through a buffer zone before it is fed into the water treatment zone, thereby at least potentially to buffer fluctuations in feed rate thereof.

11. A method as claimed in claim 10, in which coagulating the solid impurities is by dispersing a suitable coagulant in the waste water downstream of the buffer zone, the coagulant acting to cause the solid impurities to form flocs in the water treatment zone.

12. A method as claimed in claim 9, in which aerating the recirculated clarified product is by means of vigorous agitation thereof, mixing of foam and feed taking place at out downstream of the coagulant addition.

13. A method as claimed in claim 9, which includes dispersing a polyelectrolyte in the waste water, downstream of the coagulant addition.

14. A method as claimed in claim 13, in which the polyelectrolyte addition takes place at or downstream of the mixing of the waste water feed and foam.

15. A method as claimed in claim 9, which includes recirculating any sludge which settles to the bottom of the water treatment zone to the waste water feed to the waste water treatment zone, upstream of the coagulant addition.

16. A method as claimed in claim 9, in which removing of the foam from the water treatment zone is by scraping it off the surface of the water in the water treatment zone.

17. In clarifying proteinaceous aqueous waste water containing solid impurities by:

feeding a proteinaceous waste water feed into and through a water treatment zone where it is subjected to various water-purification steps and from which it issues as a clarified product;

coagulating solid impurities in the waste water as it passes through said water treatment zone;

recirculating a proportion of the clarified product through the water treatment zone;

aerating the recirculated clarified product to form a foam, the recirculated foam being mixed with the waste water feed in or upstream of the water treatment zone;

permitting the foam to rise to and float on the surface of the water in the water treatment zone; and removing said foam and coagulated solids entrapped therein from the surface of the water in the water treatment zone, the improvement which comprises recirculating a proportion of the clarified product and aerating said recirculating clarified product to form a foam, the air content of which amounts to no less than 18% by volume of said waste water feed.

18. A method of clarifying proteinaceous tannery waste water containing solid impurities, to provide a clarified water product containing a reduced proportion of said solid impurities and a fast-draining foam product containing solid impurities removed from the tannery waste water, the method comprising treating a proteinaceous tannery waste water feed in a single water treatment zone into which it is fed and from which issue a clarified water product and a fast-draining foam product, by:

coagulating solid impurities in the waste water as it passes through said water treatment zone;

recirculating a proportion of the clarified product through the water treatment zone and aerating the recirculated clarified product to form a foam, the air content of which amounts to no less than 18% by volume of the waste water feed;

permitting the foam to rise to and float on the surface of the water in the water treatment zone; and removing, as a fast-draining foam product, said foam and coagulated solids entrapped therein from the surface of the water in the water treatment zone, while removing fully clarified final water product directly from the water treatment zone.

* * * * *